United States Patent [19]
Conley et al.

[11] Patent Number: 4,805,517
[45] Date of Patent: Feb. 21, 1989

[54] GAS RETURN RAILWAY CAR HYDRAULIC CUSHIONING UNIT AND METHOD OF CONVERTING A SPRING RETURN UNIT

[75] Inventors: Arthur Conley, Hayward; Owen Darcey, Los Altos, both of Calif.; Joseph Mulligan, Jr., Omaha, Nebr.

[73] Assignee: Rail Car America, Inc., San Francisco, Calif.

[21] Appl. No.: 121,176

[22] Filed: Nov. 16, 1987

[51] Int. Cl.$^4$ .............................................. F15B 15/22
[52] U.S. Cl. ............................................. 92/8; 92/143; 91/408; 91/409; 213/43; 213/223; 29/402.06; 29/402.17; 188/287; 267/64.15
[58] Field of Search ............ 92/8, 10, 11, 143, DIG. 2; 213/1 A, 7, 9, 10, 22, 43, 40 R, 220, 223; 29/402.06, 402.17; 188/287, 269; 267/64.15; 91/402, 400, 405, 404, 409

[56] References Cited
U.S. PATENT DOCUMENTS

| | | | |
|---|---|---|---|
| 2,084,952 | 6/1937 | Field | 29/402.17 |
| 2,924,305 | 2/1960 | Roder | 188/269 |
| 2,939,696 | 6/1960 | Tuczek | 188/269 |
| 3,040,907 | 6/1962 | Pelabon | 213/223 |
| 3,201,112 | 8/1965 | Wossner | 267/64.15 |
| 3,252,587 | 5/1966 | Scales | 213/43 |
| 3,525,449 | 8/1970 | Zanow | 213/43 |
| 3,596,774 | 8/1971 | MacCurdy | 213/43 |
| 3,731,771 | 5/1973 | Borgo | 213/43 |
| 3,944,270 | 3/1976 | Kreuzer | 213/223 |
| 4,026,418 | 5/1977 | Hawthorne | 213/43 |
| 4,040,523 | 8/1977 | Carle et al. | 213/43 |

Primary Examiner—Robert E. Garrett
Assistant Examiner—Thomas Denion
Attorney, Agent, or Firm—John A. Beehner

[57] ABSTRACT

A railway car hydraulic cushioning unit prevents the mixing of gas and hydraulic fluid in chambers interiorly and exteriorly of a high pressure cylinder unit by strategic placing of metering ports through the cylinder wall at positions below the level of gas in the exterior chamber. The invention is furthermore directed to a method for converting hydraulic cushioning units adapted for connection to an external spring operated restoring mechanism to a self-contained gas return unit.

8 Claims, 4 Drawing Sheets

F.G

GAS RETURN RAILWAY CAR HYDRAULIC CUSHIONING UNIT AND METHOD OF CONVERTING A SPRING RETURN UNIT

BACKGROUND OF THE INVENTION

The present invention is directed generally to a gas return railway car hydraulic cushioning device designed to maintain separation between the pressurized gas and hydraulic oil therein, and to a method of converting a hydraulic cushioning unit, adapted for connection to an external spring operated restoring mechanism, to a self-contained gas return unit.

The cushioned underframe of a railway car generally includes a pair of end-of-car cushioning devices or gears at opposite ends of the car for providing a resilient or hydraulically controlled connection between the center sill and coupler. Each gear includes a hydraulic system consisting of two chambers related by valves and ports. These include the high pressure inner cylinder having a piston reciprocal therein and the low pressure outer housing.

Impact energy from coupling, starting and stopping forces is transmitted from the coupler through the outer housing and hydraulic cylinder system to the center sill of the car. As the cylinder closes on the piston through impact, oil is forced from the cylinder into the outer housing through metering ports appropriately sized and placed. The oil is instantly returned behind the piston so the hydraulic cushioning is continuously provided with the cylinder if movement of the unit is reversed.

When external forces are removed from the unit, the piston should be returned to a neutral position so the unit can effectively cushion the next impact. Restoring forces have conventionally been provided either by the repositioning springs of a separate restoring mechanism or by pressurized gas within the cushioning unit itself. Known gears including either restoring system have certain disadvantages.

Since the repositioning springs of mechanical restoring mechanisms are typically situated below the hydraulic cushioning unit, the restoring force is offset from the center line of the cylinder and thereby induces a canting of the unit's housing within the sill. Such off-center loading causes wear on the piston, shaft and other parts with most parts being particularly worn on one side. The purchase and maintenance of the compression spring restoring mechanism adds to the cost of the hydraulic cushioning unit. Breakage of the return springs or other failure of the restoring mechanism can furthermore disable the railway car for normal operation.

Gas return hydraulic cushioning units eliminate the off center forces and maintenance problems associated with mechanical restoring mechanisms but such units to date are either expensive to manufacture or provide an unpredictable spongy cushioning action. "Freight Saver" gas return gears afford predictable cushioning action by incorporating an extra piston to maintain separation between the hydraulic fluid and pressurized gas. The extra piston and associated structure, however increases the manufacturing cost of that gear. Other gas return gears simply allow foaming action between the hydraulic oil and pressurized gas but these generally produce a spongy unpredictable cushioning action due to the compressability of the oil and gas mixture.

Accordingly, a primary object of the invention is to provide an improved gas return hydraulic cushioning unit.

More specifically, an object of the invention is to provide such a unit wherein separation between the hydraulic oil and pressurized gas is maintained without an additional piston or other moving parts.

Another object is to provide such a unit of simple and economical construction.

Another object is to provide such a unit which eliminates the necessity for a separate mechanical restoring mechanism.

Another object is to provide such a unit wherein restoring forces are centrally directed so as to eliminate canting of the housing and one sided wear on many gear parts.

Another object is to provide a practical method of converting a railway car hydraulic cushioning unit adapted for connection to an external spring operated restoring mechanism to a self-contained gas return unit.

Another object is to provide such a method which requires minimum modification to the hydraulic cushioning unit.

Finally, another object is to provide a gas return railway car hydraulic cushion unit which is simple and rugged in construction, economical to manufacture and efficient in operation.

SUMMARY OF THE INVENTION

The present invention is directed to an improved gas return railway car hydraulic cushioning unit and to relatively simple method for converting a hydraulic cushioning unit adapted for use with an external spring operated restoring mechanism to a self-contained gas return unit.

The hydraulic cushioning unit of the invention includes a high pressure cylinder encased within an outer housing having opposite ends closed by cylinder heads defining the low pressure reservoir between the high pressure cylinder and outer housing. The high pressure cylinder is movable longitudinally of a piston having a piston rod extended through an opening at the rod end of the housing for securement to the railway car center sill. A series of metering or porting holes are formed through the wall of the high pressure cylinder so as to provide a hydraulically controlled cushioned transfer of forces between the coupler and center sill of the railway car. The main reservoir is only partially filled with hydraulic oil with the remaining space above the oil charged with a pressurized gas.

An important feature of the present invention is the strategic placement of the porting holes below the level of gas in the main reservoir thereby to minimize any mixing of the oil and gas and foaming action resulting therefrom. As a result, the unit affords a positive predictable cushioning effect free of the variances encountered with units wherein the oil and pressurized gas are turbulently mixed.

A hydraulic cushioning unit adapted for use with an external spring-biased restoring mechanism can be easily converted to a self-contained gas return unit by simply removing the high pressure cylinder, plugging any metering holes above the level of gas in the main reservoir, providing substitute metering holes through the cylinder below the level of gas in the main reservoir and then reassembling the unit, adding oil and charging the space above the oil with pressurized gas. As a result, the metering flow of hydraulic fluid between the high pressure cylinder and outer housing all occurs below the level of gas thereby virtually eliminating all turbulent mixing of the oil and gas.

The present invention thus affords a substantial advancement in the repair and maintenance of railway car end of car cushioning units. Conventional spring return gears can be made better than new by elimination of the compression spring restoring mechanism and by conversion to the simpler and more efficient gas return operation.

DESCRIPTION OF THE PREFERRED EMBODIMENT

Figures 1, 2:
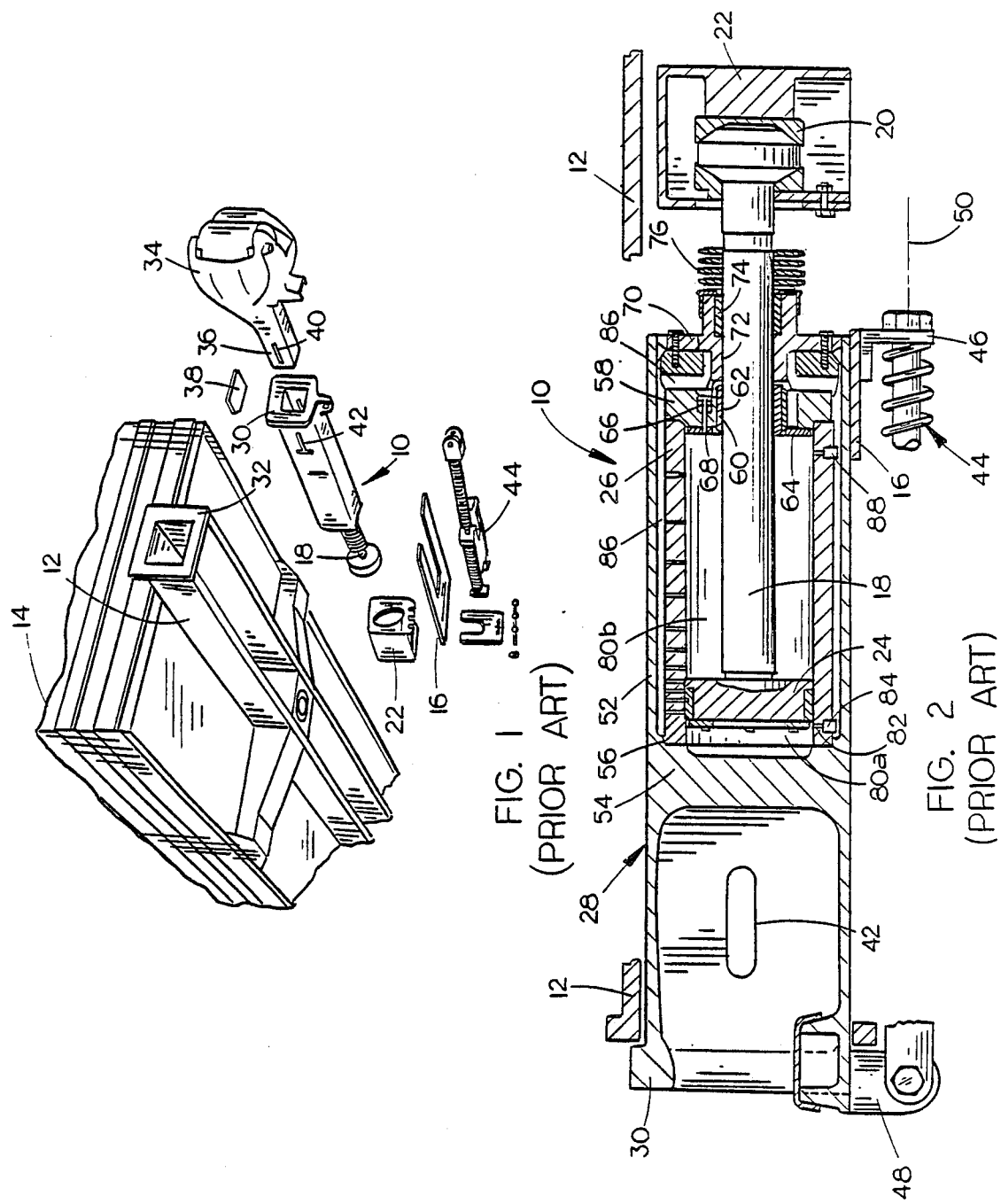
FIG. 1 is a partial exposed perspective view of the cushioned underframe at one end of a railway car.
FIG. 2 is a partial side sectional view of a railway car hydraulic cushioning unit of the prior art as installed in the cushioned underframe.
Figure 3:
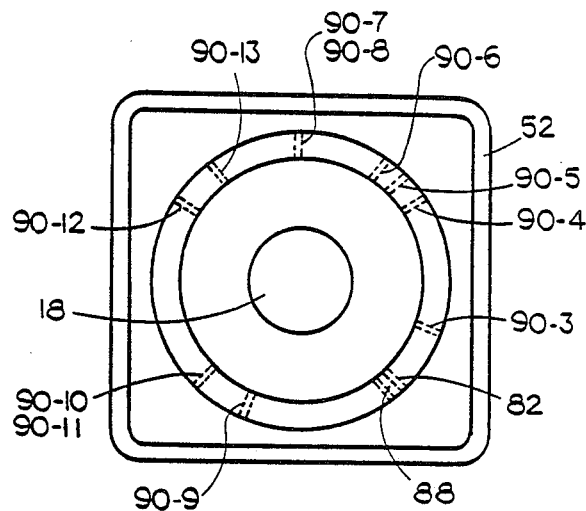
FIG. 3 is an end sectional view illustrating the various ports through the high pressure cylinder of an unmodified prior art gear.

FIGS. 1-3 illustrate a known railway car hydraulic cushioning unit 10 which is a typical candidate for improvement according to the present invention.

FIG. 1 illustrates that the hydraulic cushioning unit 10 is adapted to be slidably supported within the sill 12 of railway car 14 by a sill base plate 16. A piston rod 18 extends from one end of the hydraulic cushioning unit 10 and carries a spherical bearing assembly 20 on its free end. The spherical bearing assembly 20 is secured against the longitudinal movement relative to the sill 12 by placement within an anchor housing 22 which, in turn, is secured within the sill 12 by welding or other suitable means.

Referring to FIG. 2, the opposite end of piston rod 18 carries a piston 24 received within a high pressure cylinder 26 that is carried within an cylinder housing 28, also shown in FIG. 1. "Draft" movement of the outer housing in a direction away from the center of the railway car is limited by engagement of abutment collar 30 on the end of the outer housing 28 with a coacting abutment collar 32 on the end of center sill 12. A conventional coupler 34 has its draw bar 36 extended through the abutment collars 32 and 30 for securement to the cylinder housing 28 by a coupler key 38 inserted through aligned slots 40 and 42 through draw bar 36 and cylinder housing 28 respectively. Accordingly, any longitudinal movement of the coupler 34 relative to the sill 12 produces a sliding movement of the cylinder housing 28 relative to piston 24 for hydraulic cushioning of both draft and buff forces on the coupler 34.

The cylinder housing 28 is biased toward abutment collar 32 on the end of sill 12 by a compression spring restoring mechanism 44 having one end secured to a bracket 46 (FIG. 2) on the underside of sill base plate 16 and an opposite end secured to a depending tongue 48 adjacent the head end of cylinder housing 28. Since the line of force 50 (FIG. 2) of restoring mechanism 44 is radially offset from the axis of piston rod 18, such force tends to induce an upward canting of the cylinder housing 28 which results in wear on the pistons 24, piston rod 18 and the various supporting apparatus, particularly on one side of those parts.

Referring to FIG. 2, the high pressure cylinder 26 is arranged within the cylinder housing 28 concentrically within a relatively thin-walled length referred to as outer housing 52. The head end of outer housing 52 is closed by a cylinder head portion 54 of cylinder housing 28, which head includes an interior annular shoulder 56 adapted for receiving and supporting the head end of high pressure cylinder 26 in press fit relation therein. The rod end of high pressure cylinder 26 is closed by an annular cylinder head 58 having a rod opening 60 therein with appropriate bearing and seal means 62 for engaging piston rod 18. Cylinder head 58 carries an annular flapper valve plate 64 which is biased by a series of springs 66 into engagement with cylinder head 58 for closing a series of high capacity apertures 68 for a valving action described below.

The rod end of outer housing 52 is likewise closed by a cylinder head 70 having a rod opening 72 therethrough for slidably supporting piston rod 18. A seal assembly 74 is secured to the cylinder head 70. An accordian like dust shield 76 extends from the seal assembly for engagement with the piston rod to cover and protect that portion of the piston rod 18 which reciprocates through cylinder head 70.

High pressure cylinder 26 defines an internal cavity 80 which is divided by piston 24 into cavities 80a and 80b on the head side and rod side of the piston respectively. A high capacity port 82 through the underside of high pressure cylinder 26 adjacent the head end is plugged to provide some resistance to free flow of fluid from the main reservoir 86 into cavity 80a. The main reservoir 86 is the space surrounding high pressure cylinder 26 including the gap between cylinder heads 58 and 70 at the rod end of cylinder 26 and outer housing 52. Another valved port 88 may be provided adjacent the rod end of the cylinder 26 for controlling impedance during "run-out" train action events wherein the piston moves rightward from the full buff position shown in FIG. 2.

Figure 6:
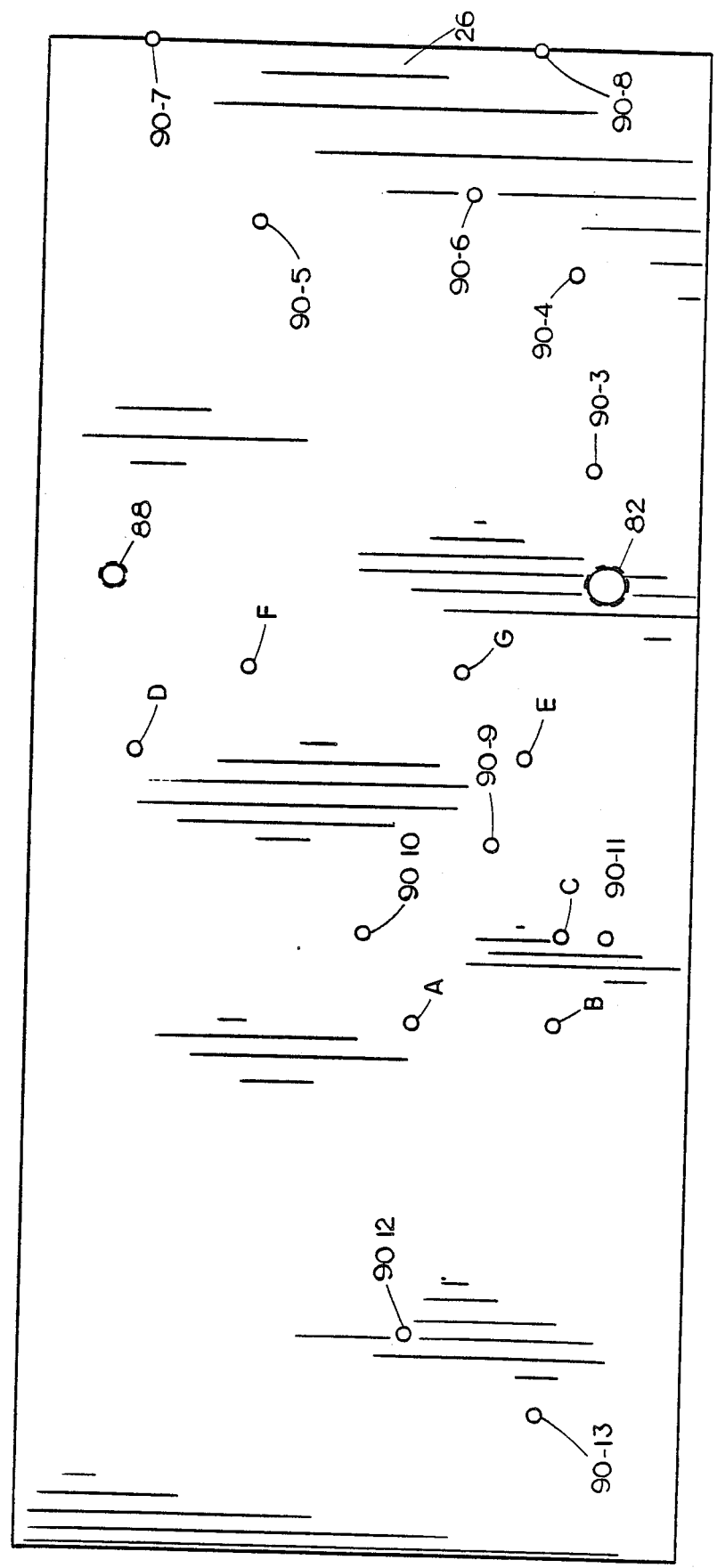
FIG. 6 is a plan view of the outer surface of the high pressure cylinder, with the cylinder wall "laid flat"

Finally, high pressure cylinder 26 has a series of open metering ports 90 arranged in longitudinally and circumferentially spaced-apart relation thereon. The circumferential spacing of metering ports 90 is evident in FIG. 3 and the longitudinal spacing is diagrammatically illustrated in FIG. 2 wherein all ports are seen as though they were aligned with a median longitudinal plane through the cylinder wall. The longitudinal spacing of such ports 90-3 through 90-13 is more accurately disclosed in FIG. 6 wherein the cylinder is shown "laid flat" with the top end of the figure corresponding to rod end of the cylinder and the bottom of the figure corresponding to the head end of the cylinder. As most clearly evident in FIG. 2, the metering ports 90-3 through 90-13 are exponentially spaced apart longitudinally so as to be somewhat clustered adjacent the head end of high pressure cylinder 26 and more sparcely positioned toward the rod end. This longitudinal spacing of course effects the hydraulic cushioning action provided by the unit 10 as follows. It is understood that, in an unmodified prior art hydraulic cushioning unit, the high pressure cylinder cavity 80 and the main reservoir 86 are substantially filled with hydraulic fluid.

During buff movement of the cylinder housing 28 to the right, as seen in FIG. 2, relative to the stationary piston 24, hydraulic fluid is expelled from cavity 80a into the main reservoir 86. That fluid is returned to cavity 80b through the flapper valve apertures 68 and plate 64.

During draft movement of the cylinder housing 28 to the left relative to stationary piston 24, as seen in FIG. 2, fluid is expelled from the cavity 80b through the metering ports 90 and into the main reservoir 86. That fluid is returned to cavity 80a through the metering orifices or ports 90 at the opposite end of the cylinder.

Because of the exponential spacing of the metering ports 90 in the longitudinal direction, draft forces on the coupler initially produce significant longitudinal movement of the cylinder housing 28 relative to piston 24 but this same initial movement causes the piston to cover and close the cluster of metering ports adjacent the head end of high pressure cylinder 26 thereby increasing the impedance within cavity 80b, i.e. the resistance to flow of fluid outwardly of cavity 80b, which slows down relative movement between the cylinder housing 28 and piston 24. Continued draft movement of the cylinder housing 28 further increases impedance to the point where the piston covers the last ports 90-7 and 88 whereupon any further draft movement of cylinder housing 28 is very slow resulting from fluid leakage past the piston seals. The extremes of the gear stroke, in both buff and draft directions, are governed by mechanical stops that are part of the railway car installation.

The hydraulic cushioning unit 10 as above-described is converted to a self-contained gas return unit as described below. Once converted, the compression spring restoring mechanism 44 may be removed from the cushion underframe since the pressurized gas within the cushioning unit will be operative to restore the cylinder housing 28 to its neutral position upon removal of external forces from the coupler 34.

Figure 4:
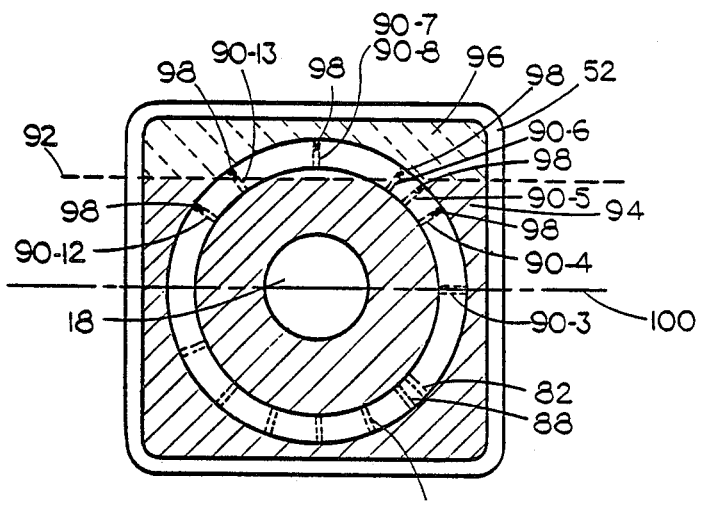
FIG. 4 is an end sectional view, similar to FIG. 3, but incorporating the improvement of the invention.
Figure 5:
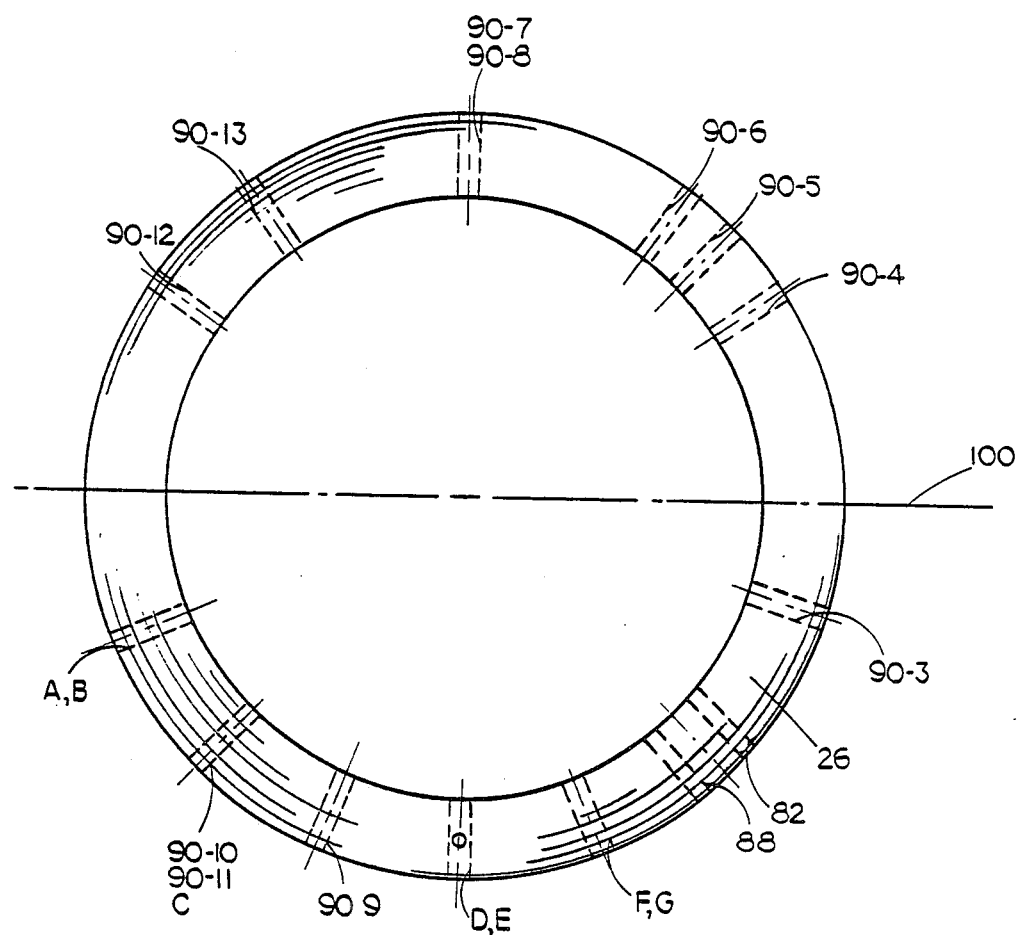
FIG. 5 is an end view of the high pressure cylinder with circumferential positions of the metering holes illustrated thereon.
Figure 7:
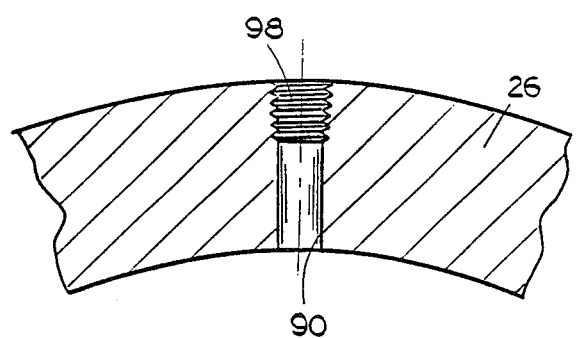
FIG. 7 is an enlarged partial sectional view through the high pressure cylinder wall showing a plugged metering hole therein.

First, FIG. 4 illustrates a hydraulic cushioning unit 10 which has been converted according to the present invention. The dotted horizontal line 92 corresponds to the top surface of hydraulic fluid 94 in the main reservoir 86 with cross hatching designating the pressurized gas 96 above the hydraulic fluid 94. Note that each of the metering ports 90 which are situated above the level of hydraulic fluid in main reservoir 86 are closed by plugs 98, as shown in detail in FIG. 7. The outer end of each such port 90 is drilled and taper reamed for =-27 NPTF type tap for receiving an internal wrenching (hex.) steel pipe plug which is installed flush to 0.060 inches below the external surface of high pressure cylinder 26 using Locktite 242 or its equivalent and torquing the plug to 300 in. lbs. The cylinder modifications for the preferred embodiment are more precisely illustrated in FIGS. 5 and 6 wherein it is seen that 7 of the metering ports 90 are plugged. These are all of the metering ports 90 situated above a horizontal plane 100 through the axis of the high pressure cylinder 26.

Specifically, the plugged holes include metering ports 90-4 through 90-8 and 90-12 and 90-13. So as not to alter the hydraulic cushioning effect produced by unit 10, substitute metering ports A-G are provided through the wall of the high pressure cylinder 26 at positions below the level of gas in the main reservoir and, in the preferred embodiment, below the plane 100 through the axis of the cylinder. Note that the longitudinal positions of substitute ports A-G correspond exactly to the longitudinal positions of the plugged metering ports 90-4 through 90-8 and 90-12 and 90-13.

Upon plugging the uppermost situated metering ports 90 and providing the substitute metering ports as described above, the high pressure cylinder is reassembled into the unit 10. The high pressure cylinder cavity 80 and main reservoir 86 are then filled with hydraulic fluid, after which approximately one quart is syphoned from the reservoir 86 so that space may be charged with a gas such as nitrogen to a pressure of approximately 450 psi. For this purpose, a gas inlet port is provided in communication with the upper most portion of main reservoir 86 The volume of gas charge in the gear fluid cavity is calculated to provide an adequate restoring force at both ends of the total piston stroke, i.e. too small a volume would result in unnecessarily high pressure when piston is in full buff position.

The gas charge pressure with the piston in "neutral" is a nominal valve which can easily absorb changes due to thermal expansion or contraction and still provide adequate restoration function.

The fluid pressure in the main reservoir 86 due to the gas 96 causes the high pressure cylinder cavity 80 to be completely filled with hydraulic fluid, preferably with no gas above the level of hydraulic fluid within the high pressure cylinder 26. All metering of hydraulic fluid through the metering ports 90 occurs well below the top surface of hydraulic fluid within the main reservoir so as to minimize any turbulence at that surface which may produce a mixing of the hydraulic fluid and gas in a foaming action as occurs in certain known hydraulic cushioning units. The plugged metering ports prevent any discharge of streams of fluid directly into the body of gas 96 and also prevent the discharge of fluid close to the interface between the hydraulic fluid and gas which could result in turbulent mixing at that interface.

Accordingly, in operation, the cushioning response of the converted hydraulic cushioning unit 10 is substantially identical to that afforded by the unit prior to conversion. The advantage is that the compression spring restoring mechanism 44 may be discarded so as to eliminate any future maintenance expenses and problems associated with that unit. Furthermore, the internal gas pressure return forces on the piston are substantially axially centered thereby avoiding the canting of the cylinder housing 28 by the spring restoring mechanism and the associated one sided wear on many of the gear parts. The improved gear according to the present invention is thus simpler in construction and more efficient in operation than the same unit prior to conversion to a self-contained gas return unit.

Whereas the invention has been shown and described in connection with a preferred embodiment thereof, it is understood that many modifications, additions and substitutions may be made which are within the intended broad scope of the appended claims. For example, the invention is in no way limited to the particular hydraulic cushioning unit illustrated in FIGS. 1 and 2. The present invention is applicable to various different models of hydraulic cushioning units made and sold by each of several manufacturers. Likewise, the structural efficiencies of the present invention may be incorporated into a newly manufactured gear without any necessity for plugging pre-existing metering ports.

Thus, there has been shown and described a hydraulic cushioning unit and method of converting the same to gas return operation which accomplish at least all of the stated objects.

We claim:

1. A hydraulic cushioning unit for use in a railway car, comprising
a high pressure cylinder having a wall and an opposite rod end and head end,
an outer housing encompassing said cylinder,
head means at the ends of said cylinder and housing for closing the ends of said cylinder and housing,
said head means and outer housing forming a main reservoir around said high pressure cylinder,
a piston movable through said cylinder,
said head means at the rod end of said cylinder and housing having a piston rod opening formed therein,
a piston rod connected to said piston and extending out of said main reservoir through said opening,
hydraulic oil partially filling said main reservoir,
a plurality of porting holes formed through the wall of said high pressure cylinder, said holes being operative to effect a metered flow of hydraulic fluid from said high pressure cylinder to said main reservoir in response to relative movement between said piston and high pressure cylinder,
a gas under pressure filling the remainder of said main reservoir and operative to restore the piston to a neutral position adjacent said rod end of the cylinder upon removal of external relative forces between said high pressure cylinder and piston,
said porting holes being arranged on the wall of said high pressure cylinder at positions below the level of gas in said main reservoir.

2. The hydraulic cushioning unit of claim 1 wherein all of said porting holes are positioned below a horizontal plane through the axis of said high pressure cylinder.

3. Hydraulic cushioning unit for use in a railway car, comprising
a high pressure cylinder having a wall and an opposite rod end and head end, an outer housing encompassing said cylinder,
head means at the ends of said cylinder and housing for closing the ends of said cylinder and housing,
said head means and outer housing forming a main reservoir around said high pressure cylinder,
a piston movable through said cylinder,
said head means at the rod end of said cylinder and housing having a piston rod opening formed therein,
a piston rod connected to said piston and extending out of said main reservoir through said opening,
hydraulic oil partially filling said main reservoir,
a plurality of porting holes formed through the wall of said high pressure cylinder, said holes being operative to effect a metered flow of hydraulic fluid from said high pressure cylinder to said main reservoir in response to relative movement between said piston and high pressure cylinder,
a gas under pressure filling the remainder of said main reservoir and operative to restore the piston to a neutral position adjacent said rod end of the cylinder upon removal of external relative forces between said high pressure cylinder and piston,
said porting holes being arranged on the wall of said high pressure cylinder at positions below the level of gas in said main reservoir,
a plurality of disabled port holes through the wall of said high pressure cylinder at positions above the level of gas in said main reservoir, and
plug means in said disabled port hole to block fluid flow therethrough.

4. The hydraulic cushioning unit of claim 3 wherein said high pressure cylinder has a respective one of said porting holes of the same general size and longitudinal position as each disabled porting hole.

5. A method of converting a railway car hydraulic cushioning unit adapted for connection to an external spring operated restoring mechanism to a self-contained gas return unit, said hydraulic cushioning unit including a high pressure cylinder having an opposite rod end and head end, an outer housing encompassing said cylinder, head means closing the ends of said cylinder and housing and forming a main reservoir between said cylinder and housing, a piston movable through said main cylinder and a piston rod extending from said piston outwardly through the head means at the rod end of the cylinder, a plurality of porting holes arranged in longitudinally and circumferentially spaced apart positions through said high pressure cylinder, and hydraulic oil at least partially filling said main reservoir, said method comprising
disassembling said high pressure cylinder from said unit,
plugging a plurality of uppermost situated porting holes through said high pressure cylinder to block fluid flow therethrough,
providing a plurality of substitute porting holes through the wall of said high pressure cylinder at positions below the plugged porting holes,
reassembling said high pressure cylinder into the unit,
at least partially filling said main reservoir with hydraulic oil,
charging the unfilled portion of said main reservoir with a pressurized gas, thereby urging said piston to a neutral position adjacent said rod end of the cylinder upon removal of external relative forces between said high pressure cylinder and piston, and
said step of providing a plurality of substitute porting holes comprising locating said substitute porting holes below the level of gas in said main reservoir upon charging said main reservoir.

6. The method of claim 5 wherein the step of providing a plurality of substitute porting holes comprises forming each of said substitute porting holes of the same general size and longitudinal position as a respective one of the plugged porting holes.

7. The method of claim 6 wherein the number of substitute porting holes is equal to the number of plugged porting holes.

8. The method of claim 5 wherein the step of providing a plurality of substitute porting holes comprises situating all of said substitute porting holes below a horizontal plane through the axis of said high pressure cylinder.

* * * * *